(12) United States Patent
Gross et al.

(10) Patent No.: US 6,353,383 B1
(45) Date of Patent: Mar. 5, 2002

(54) ALARM APPARATUS FOR MONITORING ACTIVITY IN A VEHICLE

(76) Inventors: Hubert L. Gross, 397 Carmel, Westland, MI (US) 48186; Robert A. Jastern, 6234 Rosemont, Detroit, MI (US) 48228

( * ) Notice: Subject to any disclaimer, the term of this patent is extended or adjusted under 35 U.S.C. 154(b) by 0 days.

(21) Appl. No.: 09/737,792

(22) Filed: Dec. 15, 2000

(51) Int. Cl.[7] .................................................. B60Q 1/00
(52) U.S. Cl. ..................... 340/425.5; 340/426; 340/430; 340/825; 340/692
(58) Field of Search ............................ 340/425.5, 426, 340/430, 825, 692

(56) References Cited

U.S. PATENT DOCUMENTS

| | | | |
|---|---|---|---|
| 3,906,472 A | * 9/1975 | Guadara et al. | 340/425.5 |
| 4,673,914 A | 6/1987 | Lee | |
| 5,119,072 A | 6/1992 | Hemingway | |
| 5,128,649 A | * 7/1992 | Elmer | 340/426 |
| 5,515,865 A | 5/1996 | Scanlon | |
| D370,339 S | 6/1996 | Pinchuk | |
| 5,640,147 A | 6/1997 | Chek et al. | |
| 5,793,291 A | 8/1998 | Thornton | |
| 5,874,889 A | * 2/1999 | Higdon et al. | 340/426 |
| 6,028,509 A | * 2/2000 | Rice | 340/449 |
| 6,091,322 A | * 7/2000 | Ang et al. | 340/425.5 |
| 6,166,625 A | * 12/2000 | Teowee et al. | 340/426 |

* cited by examiner

*Primary Examiner*—Jeffery Hofsass
*Assistant Examiner*—Daniel Previl

(57) ABSTRACT

An alarm apparatus for monitoring activity in a vehicle for alerting the user know of any possible emergencies in one's vehicle. The alarm apparatus for monitoring activity in a vehicle includes a microphone being adapted to be disposed in a passenger compartment of a vehicle; and also includes a transmitter being connected to the microphone and being adapted to be disposed in the vehicle for transmitting signals; and further includes a remote receiver/transmitter being adapted to be carried by a user for receiving signals from the transmitter.

10 Claims, 3 Drawing Sheets

ALARM APPARATUS FOR MONITORING ACTIVITY IN A VEHICLE

BACKGROUND OF THE INVENTION

1. Field of the Invention

The present invention relates to a safe side pocket alarm and more particularly pertains to a new alarm apparatus for monitoring activity in a vehicle for alerting the user know of any possible emergencies in one's vehicle.

2. Description of the Prior Art

The use of a safe side pocket alarm is known in the prior art. More specifically, a safe side pocket alarm heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,793,291; U.S. Pat. No. 5,640,147; U.S. Pat. No. 5,515,865; U.S. Pat. No. 5,119,072; U.S. Pat. No. 4,673,914; and U.S. Pat. No. Des. 370,339.

While these devices fulfill their respective, particular objectives and requirements, the aforementioned patents do not disclose a new alarm apparatus for monitoring activity in a vehicle. The inventive device includes a microphone being adapted to be disposed in a passenger compartment of a vehicle; and also includes a transmitter being connected to the microphone and being adapted to be disposed in the vehicle for transmitting signals; and further includes a remote receiver/transmitter being adapted to be carried by a user for receiving signals from the transmitter.

In these respects, the alarm apparatus for monitoring activity in a vehicle according to the present invention substantially departs from the conventional concepts and designs of the prior art, and in so doing provides an apparatus primarily developed for the purpose of alerting the user know of any possible emergencies in one's vehicle.

SUMMARY OF THE INVENTION

In view of the foregoing disadvantages inherent in the known types of safe side pocket alarm now present in the prior art, the present invention provides a new alarm apparatus for monitoring activity in a vehicle construction wherein the same can be utilized for alerting the user know of any possible emergencies in one's vehicle.

The general purpose of the present invention, which will be described subsequently in greater detail, is to provide a new alarm apparatus for monitoring activity in a vehicle which has many of the advantages of the safe side pocket alarm mentioned heretofore and many novel features that result in a new alarm apparatus for monitoring activity in a vehicle which is not anticipated, rendered obvious, suggested, or even implied by any of the prior art safe side pocket alarm, either alone or in any combination thereof.

To attain this, the present invention generally comprises a microphone being adapted to be disposed in a passenger compartment of a vehicle; and also includes a transmitter being connected to the transmitter and being adapted to be disposed in the vehicle for transmitting signals; and further includes a remote receiver/transmitter being adapted to be carried by a user for receiving signals from the transmitter.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new alarm apparatus for monitoring activity in a vehicle which has many of the advantages of the safe side pocket alarm mentioned heretofore and many novel features that result in a new alarm apparatus for monitoring activity in a vehicle which is not anticipated, rendered obvious, suggested, or even implied by any of the prior art safe side pocket alarm, either alone or in any combination thereof.

It is another object of the present invention to provide a new alarm apparatus for monitoring activity in a vehicle which may be easily and efficiently manufactured and marketed.

It is a further object of the present invention to provide a new alarm apparatus for monitoring activity in a vehicle which is of a durable and reliable construction.

An even further object of the present invention is to provide a new alarm apparatus for monitoring activity in a vehicle which is susceptible of a low cost of manufacture with regard to both materials and labor, and which accordingly is then susceptible of low prices of sale to the consuming public, thereby making such alarm apparatus for monitoring activity in a vehicle economically available to the buying public.

Still yet another object of the present invention is to provide a new alarm apparatus for monitoring activity in a vehicle which provides in the apparatuses and methods of the prior art some of the advantages thereof, while simultaneously overcoming some of the disadvantages normally associated therewith.

Still another object of the present invention is to provide a new alarm apparatus for monitoring activity in a vehicle for alerting the user know of any possible emergencies in one's vehicle.

Yet another object of the present invention is to provide a new alarm apparatus for monitoring activity in a vehicle which includes a microphone being adapted to be disposed in a passenger compartment of a vehicle; and also includes a transmitter being connected to the microphone and being adapted to be disposed in the vehicle for transmitting signals; and further includes a remote receiver/transmitter being adapted to be carried by a user for receiving signals from the transmitter.

Still yet another object of the present invention is to provide a new alarm apparatus for monitoring activity in a vehicle that prevents stress and anxiety for the user upon leaving a child or pet in one's vehicle.

Even still another object of the present invention is to provide a new alarm apparatus for monitoring activity in a vehicle that prevents harm to a pet or child left in a parked vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is a perspective view of the transmitter of the present invention.

DESCRIPTION OF THE PREFERRED EMBODIMENT

Figure 1:
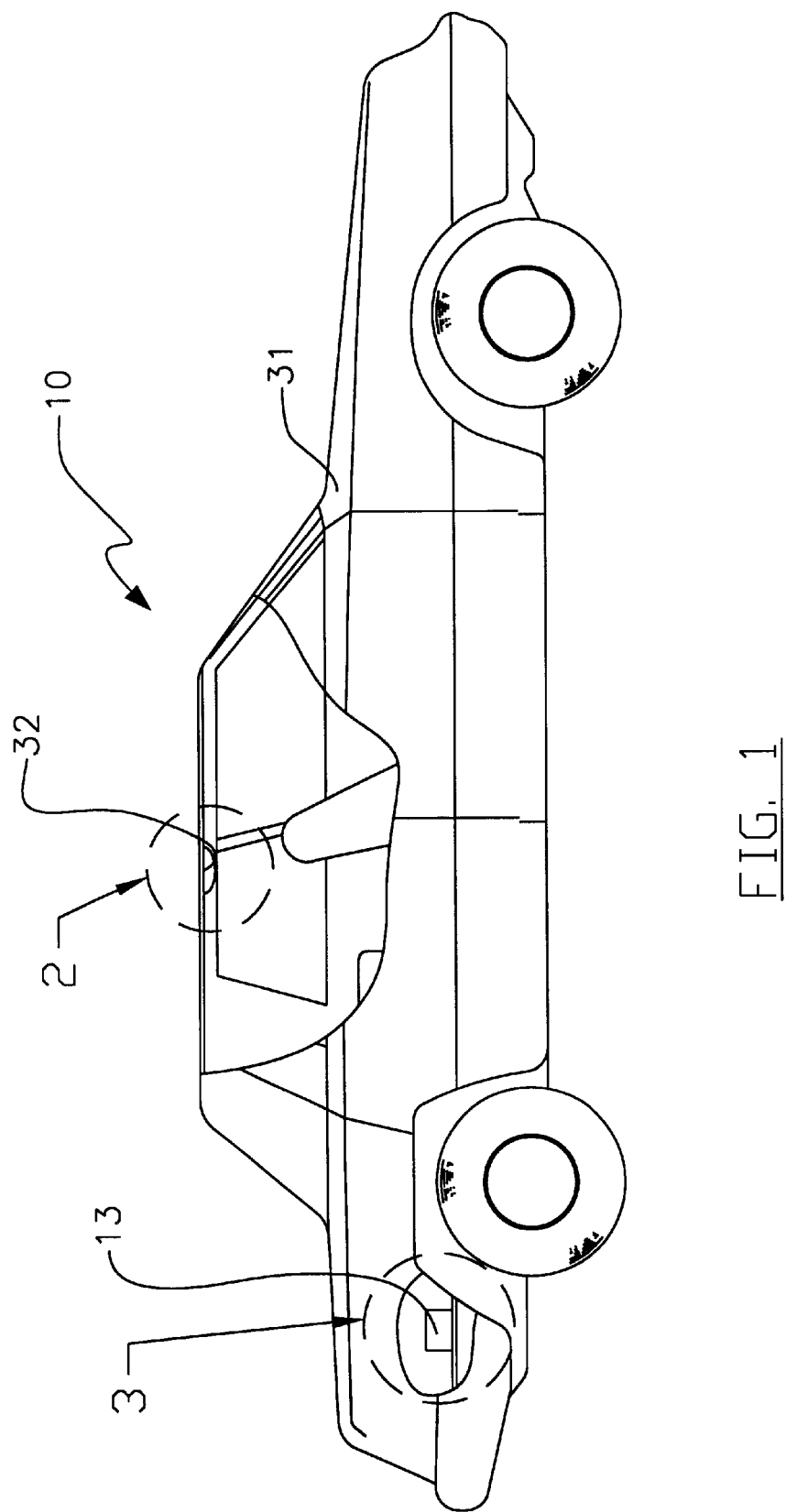
FIG. 1 is a side elevational view of a new alarm apparatus for monitoring activity in a vehicle according to the present invention and shown in use in a vehicle.
Figure 2:
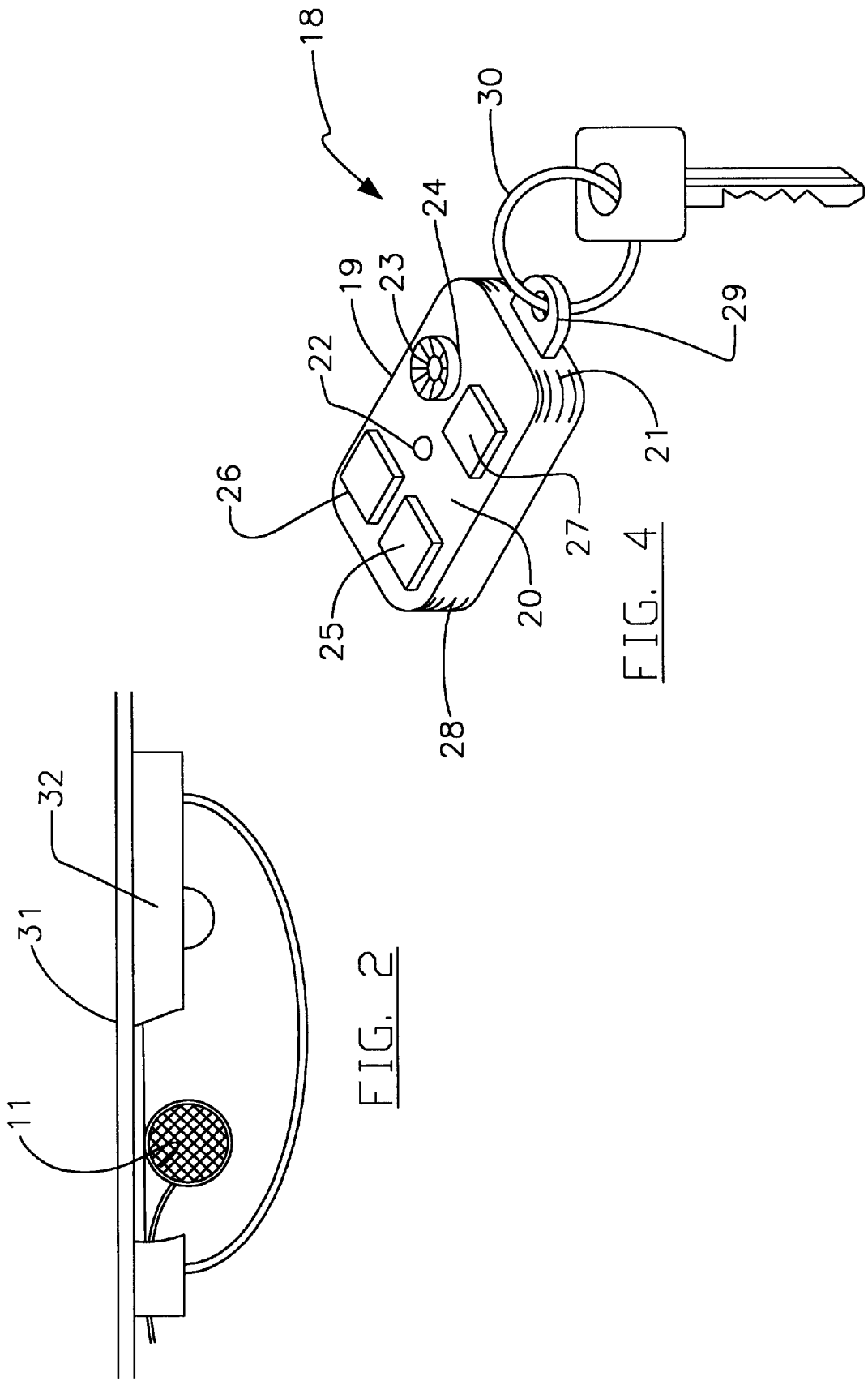
FIG. 2 is a side elevational view of the microphone of the present invention.
Figure 3:
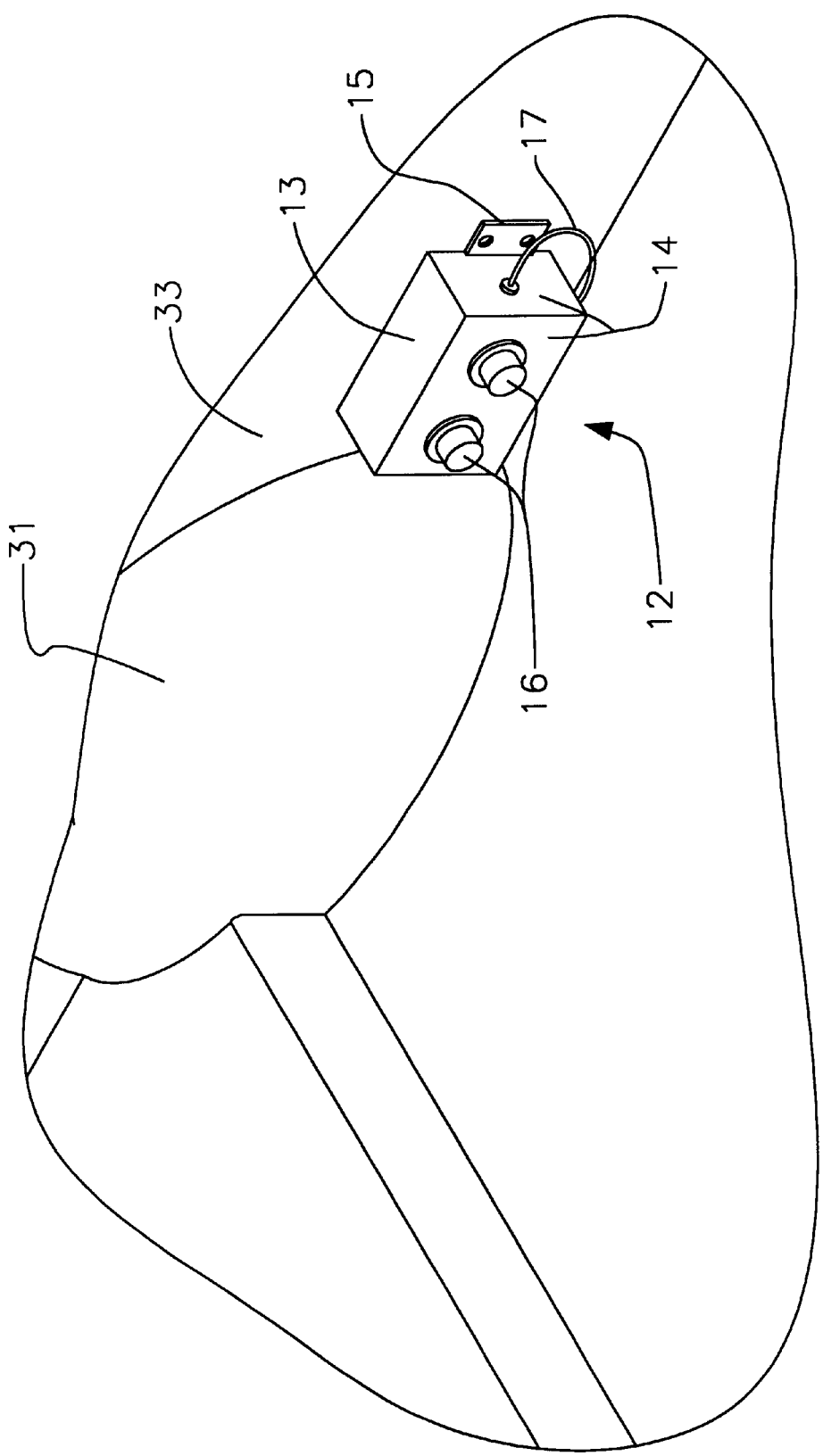
FIG. 3 is a perspective view of the remote receiver of the present invention.

With reference now to the drawings, and in particular to FIGS. 1 through 4 thereof, a new alarm apparatus for monitoring activity in a vehicle embodying the principles and concepts of the present invention and generally designated by the reference numeral 10 will be described.

As best illustrated in FIGS. 1 through 4, the alarm apparatus for monitoring activity in a vehicle 10 generally comprises a microphone 11 being adapted to be securely disposed in a passenger compartment of a vehicle 31. The microphone 11 is adapted to be disposed in a dome light 32 of the vehicle 31 and is adapted to pick up medium to high level noises in the vehicle 31.

A transmitter 12 is conventionally connected to the microphone 11 and is adapted to be disposed in the vehicle 31 for transmitting signals. The transmitter 12 includes a first housing 13, and also includes a bracket 15 being conventionally attached to the first housing 13 and being adapted to fasten to a wall 33 in the vehicle 31, and further includes a wire 17 extending through a wall 14 for energizing the transmitter 12, and also includes button switches 16 being depressibly disposed in a wall 14 of the first housing 13 for resetting and turning on/off the transmitter. The transmitter 12 is actuated by the microphone 11 upon the microphone 11 picking up medium to high level noises in the vehicle 31.

A remote receiver/transmitter 18 is adapted to be carried by a user for receiving signals from the transmitter 12. The remote receiver/transmitter 18 includes a second housing 19, and also includes a light-emitting member 22 conventionally disposed in a wall 20 of the second housing 19, and further includes a speaker 23 conventionally disposed in the wall 20 of the second housing 19, and also includes switch members 25–27 depressibly and conventionally disposed in the wall 20 of the second housing 19, and further includes a sound chip 24 being conventionally disposed in the second housing 19 and being conventionally connected to the speaker 23, and also includes a battery 28 being conventionally disposed in the second housing 19. The switch members 25–27 include a vehicle door lock switch 25 being adapted to remotely lock a door of the vehicle 31, a vehicle door unlock switch 26 being adapted to remotely unlock the door of the vehicle 31, and an alarm on/off switch 27 for deactivating the sound chip 24. The remote receiver/transmitter 18 further includes an eyelet 29 being securely and conventionally attached to an end wall 21 of the second housing 19 and being adapted to receive a key ring 30 with the second housing 19 measuring approximately 2 inches long, 1½ inches wide, and ½ inch depth.

In use, the user activates the transmitter 12 by depressing one of the button switches 16 on the first housing 13 and takes the remote receiver/transmitter 18 with oneself. If a pet or a child is left in the parked vehicle 31, the microphone 11 will pick up medium to high level noises and will actuate the transmitter 12 which sends an alarm signal to the remote receiver/transmitter 18 to notify the user of an emergency situation in the vehicle 31; whereupon, the user can quickly return to one's vehicle 31.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. An alarm apparatus for monitoring activity in a vehicle comprising:

a microphone being adapted to be disposed in a passenger compartment of a vehicle;

a transmitter being connected to said microphone and being adapted to be disposed in the vehicle for transmitting signals; and a remote receiver/transmitter being adapted to be carried by a user for receiving signals from said transmitter;

wherein said microphone is adapted to be disposed in a dome light of the vehicle and is adapted to pick up medium to high level noises in the vehicle; and wherein said transmitter includes a first housing, and also includes a bracket being attached to said first housing and being adapted to fasten to a wall in the vehicle, and further includes a wire extending through a wall of said first housing, and also includes button switches being disposed in a wall of said first housing, said transmitter being actuated by said microphone upon said microphone picking up medium to high level noises in the vehicle.

2. An alarm apparatus for monitoring activity in a vehicle as described in claim 1, wherein said remote receiver/transmitter includes a second housing, and also includes a light-emitting member disposed in a wall of said second housing, and further includes a speaker disposed in said wall of said second housing, and also includes switch members disposed in said wall of said second housing, and further includes a sound chip being disposed in said second housing and being connected to said speaker, and also includes a battery being disposed in said second housing for energizing said remote receiver/transmitter.

3. An alarm apparatus for monitoring activities in a vehicle as described in claim 2, wherein said switch members include a vehicle door lock switch being adapted to remotely lock a door of the vehicle, a vehicle door unlock switch being adapted to remotely unlock the door of the vehicle, and an alarm on/off switch for deactivating said sound chip.

4. An alarm apparatus for monitoring activity in a vehicle as described in claim 1, wherein said remote receiver/transmitter further includes a eyelet being securely attached to an end wall of said second housing and being adapted to receive a key ring.

5. An alarm apparatus for monitoring activity in a vehicle comprising:

a microphone being adapted to be disposed in a passenger compartment of a vehicle, said microphone being adapted to be disposed in a dome light of the vehicle and being adapted to pick up medium to high level noises in the vehicle;

a transmitter being connected to said microphone and being adapted to be disposed in the vehicle for transmitting signals, said transmitter including a first housing, and also including a bracket being attached to said first housing and being adapted to fasten to a wall in the vehicle, and further including a wire extending through a wall for energizing said transmitter, and also including button switches being disposed in a wall of said first housing for resetting and turning on/off said transmitter, said transmitter being actuated by said microphone upon said microphone picking up medium to high level noises in the vehicle; and a remote receiver/transmitter being adapted to be carried by a user for receiving signals from said transmitter, said remote receiver/transmitter including a second housing, and also including a light-emitting member disposed in a wall of said second housing, and further including a speaker disposed in said wall of said second housing, and also including switch members disposed in said wall of said second housing, and further including a sound chip being disposed in said second housing and being connected to said speaker, and also including a battery disposed in said second housing, said switch members including a vehicle door lock switch being adapted to remotely lock a door of the vehicle, a vehicle door unlock switch being adapted to remotely unlock the door of the vehicle, and an alarm on/off switch for deactivating said sound chip, said remote receiver/transmitter further including an eyelet being securely attached to an end wall of said second housing and being adapted to receive a key ring, said second housing measuring approximately 2 inches long, 1½ inches wide, inch depth.

6. An alarm apparatus for monitoring activity in a vehicle comprising:

a microphone being adapted to be disposed in a passenger compartment of a vehicle;

a transmitter being connected to said microphone and being adapted to be disposed in the vehicle for transmitting signals; and a remote receiver/transmitter being adapted to be carried by a user for receiving signals from said transmitter;

wherein said transmitter includes a first housing, and also includes a bracket being attached to said first housing and being adapted to fasten to a wall in the vehicle, and further includes a wire extending through a wall of said first housing, and also includes button switches being disposed in a wall of said first housing, said transmitter being actuated by said microphone upon said microphone picking up medium to high level noises in the vehicle.

7. An alarm, apparatus for monitoring activity in a vehicle as described in claim 6, wherein said microphone is adapted to be disposed in a dome light of the vehicle and is adapted to pick up medium to high level noises in the vehicle.

8. An alarm apparatus for monitoring activity in a vehicle as described in claim 6, wherein said remote receiver/transmitter includes a second housing, and also includes a light-emitting member disposed in a wall of said second housing, and further includes a speaker disposed in said wall of said second housing, and also includes switch members disposed in said wall of said second housing, and further includes a sound chip being disposed in said second housing and being connected to said speaker, and also includes a battery being disposed in said second housing for energizing said remote receiver/transmitter.

9. An alarm apparatus for monitoring activity in a vehicle as described in claim 8, wherein said switch members include a vehicle door lock switch being adapted to remotely lock a door of the vehicle, a vehicle door unlock switch being adapted to remotely unlock the door of the vehicle, and an alarm on/off switch for deactivating said sound chip.

10. An alarm apparatus for monitoring activity in a vehicle as described in claim 6, wherein said remote receiver/transmitter further includes a eyelet being securely attached to an end wall of said second housing and being adapted to receive a key ring.

* * * * *